United States Patent [19]

Harrington et al.

[11] Patent Number: 4,578,115

[45] Date of Patent: Mar. 25, 1986

[54] ALUMINUM AND COBALT COATED THERMAL SPRAY POWDER

[75] Inventors: John H. Harrington, Warwick; Subramaniam Rangaswamy, Port Jefferson Station, both of N.Y.

[73] Assignee: Metco Inc., Westbury, N.Y.

[21] Appl. No.: 597,140

[22] Filed: Apr. 5, 1984

[51] Int. Cl.$^4$ .................. B32B 15/00; B32B 15/18
[52] U.S. Cl. .................... 75/255; 428/557; 428/570; 428/678; 427/34; 427/423
[58] Field of Search ............ 75/255; 428/557, 558, 428/570, 660, 678; 427/34, 423

[56] References Cited

U.S. PATENT DOCUMENTS

| | | | |
|---|---|---|---|
| 3,322,515 | 5/1967 | Dittrich et al. | 29/191.2 |
| 3,841,901 | 10/1974 | Novinski et al. | 106/1 |
| 4,019,875 | 4/1977 | Dittrich et al. | 75/255 |
| 4,181,525 | 1/1980 | Novinski | 75/255 |
| 4,313,760 | 2/1982 | Dardi et al. | 75/255 |
| 4,370,367 | 1/1983 | Novinski et al. | 75/255 |

FOREIGN PATENT DOCUMENTS 2028378  5/1980  United Kingdom .

*Primary Examiner*—Wayland Stallard
*Attorney, Agent, or Firm*—H. S. Ingham; F. L. Masselle; E. T. Grimes

[57] ABSTRACT

A thermal spray composite is disclosed, comprised of a base constituent formed from at least one of the base metals nickel, iron and cobalt, and at least one of the modifying elements chromium and aluminum, plus individual constituents aluminum, cobalt and, optionally, molybdenum. In a preferred form, the composite is a powder having an alloy core of the base metal and the modifying element, the core having fine particles of the individual elements secured thereto with a binder. The process of thermal spraying the composite is also disclosed, and the resulting coatings have a high degree of high temperature corrosion resistance and tenacity compared to prior art thermal sprayed coatings.

25 Claims, No Drawings

ALUMINUM AND COBALT COATED THERMAL SPRAY POWDER

This invention relates to a thermal spray powder which will produce metallic coatings characterized by tenacity and corrosion resistance, and to a process for thermal spraying such coatings.

BACKGROUND OF THE INVENTION

Thermal spraying, also known as flame spraying, involves the heat softening of a heat fusible material such as metal or ceramic, and propelling the softened material in particulate form against a surface which is to be coated. The heated particles strike the surface and bond thereto. A conventional thermal spray gun is used for the purpose of both heating and propelling the particles. In one type of thermal spray gun, the heat fusible material is supplied to the gun in powder form. Such powders are typically comprised of small particles, e.g., between 100 mesh U.S. standard Screen size and about 5 microns.

A thermal spray gun normally utilizes a combustion or plasma flame to produce the heat for melting of the powder particles. It is recognized by those of skill in the art, however, that other heating means may be used as well, such as electric arcs, resistance heaters or induction heaters, and these may be used alone or in combination with other forms of heaters. In a powder-type combustion thermal spray gun, the carrier gas, which entrains and transports the powder, can be one of the combustion gases or an inert gas such as nitrogen, or it can be simply compressed air. In a plasma spray gun, the primary plasma gas is generally nitrogen or argon. Hydrogen or helium is usually added to the primary gas. The carrier gas is generally the same as the primary plasma gas, although other gases, such as hydrocarbons, may be used in certain situations.

The material alternatively may be fed into a heating zone in the form of a rod or wire. In the wire type thermal spray gun, the rod or wire of the material to be sprayed is fed into the heating zone formed by a flame of some type, where it is melted or at least heat-softened and atomized, usually by blast gas, and thence propelled in finely divided form onto the surface to be coated. The rod or wire may be conventionally formed as by drawing, or may be formed by sintering together a powder, or by bonding together the powder by means of an organic binder or other suitable binder which disintegrates in the heat of the heating zone, thereby releasing the powder to be sprayed in finely divided form. In other forms the wire may have a coating sheath of one component and a core of the others, or may be made by twisting strands of the components.

Coatings produced by thermal spraying alloys of nickel, iron, cobalt or combinations thereof as a base metal which contain, in the alloy, chromium and optionally aluminum and/or other elements are used to provide corrosion protection of metal components such as in gas turbine engines and boiler systems. Cobalt, for example, is used as either a base metal or an alloying element to improve high temperature creep and strength properties in cast and wrought superalloys. However, it is well known that cobalt is not classified as a oxidation resistant metal. Scaling and oxidation rates of unalloyed cobalt in air are many times those of nickel. The scaling and oxidation resistance of cobalt-base alloys at high temperature is largely a function of chromium content. As a result, cast or wrought parts fabricated of cobalt alloys frequently require special coatings for protection.

However, in the thermal spraying of such nickel, iron or cobalt alloys, the bond strength of the resultant coatings is often not satisfactory, even where the coatings are thermal sprayed using a plasma spray gun. Also, to obtain resistance to the corrosive conditions in the application, an alloying element such as yttrium or a rare earth metal is often added, but thermal spray powders or wires of such alloys are expensive to manufacture. Typical alloys of this type are disclosed, for example, in U.S. Pat. No. 4,313,760, and in U.K. patent application No. GB 2,028,378A published Mar. 5, 1980.

To achieve high density and improved bonding, alloy powders are plasma sprayed in a low pressure inert atmosphere chamber, an operation that is slow and costly and requires sophisticated vacuum and work handling equipment. There are similar and even more complex problems with vapor deposition which is an alternative coating method known in the field. Chambers also preclude deposition onto large components such as boilers.

Coatings having improved bond strength may be thermal sprayed using a composite powder formed of metals capable of reacting exothermically as described in U.S. Pat. No. 3,322,515. One such powder has a nickel core with about 5 percent by weight of fine particles of aluminum bonded to the surface thereof with an organic binder. The core may be alloyed with another metal such as chromium. Cobalt plus aluminum, and molybdenum plus aluminum are others of many exothermic pairs mentioned therein.

Several other patents teach improved clad powders to produce thermal sprayed coatings having good bond strength and the capability of being readily machined. One is U.S. Pat. No. 3,841,901 which discloses a powder of nickel, copper or iron core coated with fine particles of aluminum and molybdenum for producing a thermal sprayed coating which has good bond strength and can readily be machined. Similarly U.S. Pat. No. 4,181,525 teaches a thermal spray powder comprising particles having a core of nickel, iron, copper, cobalt or alloys thereof coated with a binder containing discreet particles of aluminum and substantially pure nickel, directed to coatings having improved machinability.

The composite powders disclosed in the above-mentioned patents are generally employed for bonding other coating materials to substrates such as steel, or for producing single step coatings for machine element applications requiring wear resistance and finishing capability. However, there has been only limited success with composite powders where corrosion resistance is required. The reasons are not well understood. In aqueous or moist environments, electrolytic problems appear to be associated with the heterogeneous nature of the coatings resulting from incomplete alloying of the cladding elements with the core during the thermal spraying process. However, protection is also lacking in dry, high temperature situations that are oxidizing or that involve sulfates and chlorides in either oxidizing or reducing conditions. If coatings contain any free nickel, as results from incomplete reaction or alloying during thermal sprayings the nickel-aluminum clad powder of U.S. Pat. No. 4,181,525, even where the powder has a nickel chromium alloy core, the coatings are especially vulnerable to attack in certain corrosive conditions. The attack is not only in the coating material but in the interface, weakening the bond and causing coatings to spall.

Chromium is used as an alloying element in a powder core to improve corrosion resistance of coatings of a thermal spray powder in which the core is clad with aluminum. However, the chromium additions have proven to reduce the bond strength of the thermal sprayed coating. For example, aluminum clad nickel-chromium alloy provides lower bond strength than aluminum clad nickel.

As taught in U.S. Pat. No. 3,322,515, for bonding purposes iron is not of itself a satisfactory component in a composite with aluminum, and iron-chromium alloy clad only with aluminum has especially poor bonding when thermal sprayed.

Thus, although composite thermal spray powders are known and available which may produce satisfactory bond strengths, higher tenacity is desired for corrosive environments, and the coatings produced from such powders are particularly lacking in sufficient corrosion resistance. On the other hand, the known alloy powders used for thermal spraying coatings for high temperature corrosion protection lack sufficient bond strength.

In view of the foregoing, a primary object of the present invention is to provide a novel thermal spray material for producing tenacious metallic coatings characterized by both high bond strength and hot corrosion resistance.

A further object of this invention is to provide an improved thermal spray process for producing tenacious metallic coating characterized by both high bond strength and hot corrosion resistance.

BRIEF DESCRIPTION OF THE INVENTION

The foregoing and other objects of the present invention are achieved by a thermal spray composite according to the present invention which comprises, as a base constituent, at least one of the base metals nickel, iron and cobalt and at least one of the modifying elements chromium and aluminum, plus elemental constituents comprising aluminum, cobalt and, optionally, molybdenum.

DETAILED DESCRIPTION OF THE INVENTION

According to the present invention, a metallic composite material has been developed for thermal spraying onto metallic substrates by conventional thermal spray equipment. The coatings produced thereby are very tenacious, having especially high bond strength. The coatings additionally have a high degree of high temperature corrosion resistance compared to prior art thermal sprayed coatings.

The thermal spray composite comprises a base constituent that may itself be a composite but is preferably an alloy of at least one of the base metals nickel, iron and cobalt, and at least one of the modifying elements chromium and aluminum. The chromium, if present as the modifying element, should be in an amount of about 1 to 55 percent by weight of the alloy. The aluminum, if present as the modifying element, should be present in the base constituent in an amount of about 1 to 55 percent by weight of the base constituent. In one desirable embodiment the aluminum modifying element is about 20 to 55 percent, and the resulting coating formed from the composite of the present invention has the additional advantage of improved ductility over the highly brittle coatings of flame sprayed alloy high in aluminum content. If chromium and aluminum are both present as modifying elements, they should total about 1 to 55 percent by weight of the base constituent. Nickel-chromium alloy, iron-chromium alloy and iron-aluminum alloy have each been found to be particularly advantageous as the base constituent, depending on the environmental exposure to which the resulting coating is subjected.

In accordance with the invention, the elemental constituents aluminum, cobalt and, optionally, molybdenum are each additionally present in the thermal spray composite but are not alloyed with each other or with the base constituent prior to use in the thermal spray process. The elemental constituents aluminum and cobalt should each be present in an amount of about 1 to 15 percent by weight of the total of the base constituent and the elemental constituents. The molybdenum, if present as a third elemental constituent, should be present in an amount of about 1 to 10 percent by weight of the total of the alloy and the elemental constituents.

The base constituent contains not only nickel, iron, cobalt or combinations of these, and chromium, aluminum or both, as set forth, but may additionally contain some amounts of other metallic elements such as yttrium or rare earth metals, and also may contain zirconium, hafnium, titanium refractory metals or metalloids such as silicon, carbon and boron. For example, the base constituent alloy may be of the types disclosed in the previously referenced U.S. Pat. No. 4,313,760 and U.K. patent application No. GB 2,028,378A. Preferably, however, the base constituent alloy is a common, simple alloy such as nickel with 20 weight percent chromium, nickel with 16 weight percent chromium and 8 weight percent iron, iron with 30 weight percent chromium, or iron with 50 weight percent aluminum.

The elemental constituents aluminum, cobalt and, optionally, molybdenum may each contain small amounts of alloying elements, but preferably each is in substantially pure form; for example, they should contain less than five and preferably less than about two percent impurities.

The term "composite" as used herein is intended to designate a structurally integral unit and does not include a mere mixture of constituents which may be physically separated without any destruction of the structure. Thus, in the case of powder, the term "composite" does not include a simple mixture of individual granules of the separate base constituent and the elemental constituents aluminum, cobalt and, optionally, molybdenum, but requires that each of the individual composite granules contain the separate constituents.

Preferably the composite is in the form of a powder. More preferably, the base constituent is in the form of a core particle, and the elemental constituents are in the form of fine particles such as $-10$ micron size, desirably secured to the core particle with a binder, preferably an organic binder. A thermal spray powder of the present invention should have a size generally in the range of about $-100$ mesh (U.S. Standard Mesh Size) to $+5$ microns, preferably about $-140$ to $+325$ mesh. In the more preferable form of powder, the starting core size is equal to, or about one or two screen sizes smaller than the desired size of the final powder, for example, $-140$ or $-170$ or $-200$ mesh size core where the final powder is to be $-140$ mesh $+325$ microns. Thus one embodiment contemplated is for example, a $-100$ mesh $+5$ micron thermal spray powder having a core of nickel, iron or cobalt alloyed with chromium or aluminum, and elemental particles of minus 10 micron aluminum, cobalt and molybdenum secured to the core with a binder.

The binder material may be any known or conventional binding material which may be used for forming a coating or binding particles together or to a surface. The binder is preferably organic and may be a varnish containing a resin as the varnish solids, or may contain a resin which does not depend on solvent evaporation in order to form a cured or set film. The binder thus may contain a catalyzed resin as the varnish solids. Examples of binders which may be used include the conventional phenolic, epoxy or alkyd varnishes, varnishes containing drying oils, such as tung oil and linseed oil, rubber and latex binders and the like. The binder may alternatively be of the water-soluble type, as for example, of the polyvinylpyrrolidone or polyvinylalcohol type. In addition to organic binders, inorganic binders may be used, such as sodium, silicate, boric acid, borax, magnesium or other soluble carbonates, nitrates, oxalates or oxychlorides, or colloidal suspensions containing oxides.

The coating of the core material with the binder containing the particles may be effected in any known or desired manner. It is simply necessary to mix the powdered ingredients together while allowing the binder to set and dry, which will result in a fairly free-flowing powder consisting of the core coated with the cladding of the aluminum, cobalt and, optionally, molybdenum.

In yet another form the core may itself be a composite of fine particles of the base metal, nickel, iron or cobalt, and fine particles of the modifying element. For example, the core may be a composite of $-10$ micron nickel particles and 20% of $-10$ micron chromium particles, with $-10$ micron particles of aluminum and cobalt secured to the composite core. The core or the composite powder itself in accordance with the invention may be manufactured in any known or desired manner, for example, it may be produced with a spray drier as in U.S. Pat. No. 3,617,358. However, the base constituent is preferably a structurally integral component so, for example, the thermal spray composite of the present invention desirably is not formed merely of fine particles of all ingredients including unalloyed chromium intermixed together with a binder.

The powders are sprayed in the conventional manner, using a powder-type thermal spray gun, though it is also possible to combine the same into the form of a composite wire or rod, using plastic or a similar binding, as for example, polyethylene or polyurethane, which decomposes in the heating zone of the gun. In the case of composite wire, the individual constituents must be incorporated in a single wire. In either wire or powder composite the constituents must be in intimate contact with each other.

The composite may be in the form of a wire having a coating sheath of one material and a core of the others, alternate coating sheaths of two of the components and a core of the third or a fourth material, a wire formed by twisting or rolling separate wire strands of the components, a wire consisting of a sheath of one component and a core containing the other components in powder or compacted form, a wire as described in previously referenced U.S. Pat. No. 3,322,515, consisting of a sheath of one component and a core containing a compacted powder mixture of this same component material and other components, a wire consisting of a plastic sheath and a core containing a compacted powder mixture of components, or other convenient form. The composite wires should have conventional sizes and accuracy tolerances for flame spray wires and thus, for example, may vary in size between 6.4 mm and 20 gauge.

In order for the wires to be satisfactory for spraying, the same must not cavitate at the tip when heated, and should preferably be capable of forming a pointed or slightly tapered tip when being melted and sprayed. Thus, if the wires have an outer layer or sheath of one component and an inner core of another component, the inner core cannot have a lower melting point than the outer sheath, as otherwise the inner core will initially melt, causing cavitation at the tip. For example, if the wire is in the form of a core with a coating sheath, the coating sheath must be aluminum, as otherwise during the spraying operation the wire will initially melt out, causing the cavitation which will interfere with a satisfactory spraying operation. The wire having the melting-point characteristics so as to allow the melting off of the tip without this cavitation is referred to herein as "non-cavitating wire."

The spraying is in all respects effected in the conventional manner previously utilized for self-bonding thermal spray material, and in particular nickel-aluminum composites. Due to the self-bonding characteristics, special surface preparation other than good cleaning is not required, though, of course, conventional surface preparation such as grit blasting should be utilized to maximize tenacity of the coating to the substrate surface.

The thermal spray composite in accordance with the invention, as contrasted with prior known thermal spray materials, produces coatings that are not only self-bonding but are highly resistant to high temperature oxidation and to oxidizing and reducing atmospheres containing molten or vaporized contaminants containing sodium, sulfur and chlorine such as are in fuels combusting in a marine environment. Additionally, and very surprisingly, the coatings are highly tenacious, typically having tensile bond strengths substantially greater than those of similar prior art composite coatings. The coatings produced from powders having nickel chromium alloy cores are especially resistant to oxidizing conditions with or without the sodium, sulfur and chlorine. The iron base powders are excellent in reducing conditions containing contaminants such as sodium sulfide and sodium chloride. The powders containing molybdenum have substantially the same and in some instances further improvements in corrosion resistance and tenacity, and additionally have an enhanced resistance to wear and impact. Typical applications are energy conversion devices; automotive and diesel combustion and turbine engines; aircraft and marine turbines; coal, oil, and fossil fueled boilers and power generation systems and components; bond coats for ceramic and metal coatings, and pulp and paper mill applications.

The following examples are given by way of illustration and not limitation.

EXAMPLE 1

Fine aluminum powder of average size about 3.5 to 5.5 microns was blended with an equal weight of fine cobalt powder of average size 1.6 microns. A polyvinylpyrolidone (PVP) binder solution containing 100 parts by volume of PVP, 100 parts of acetic acid and 700 parts of water was prepared separately. Approximately 40 cc of this solution was added to 400 gms of nickel 20 percent chromium alloy core which had a mesh size of −170 +325. This was mixed well. To this, about 55 gms of the blended aluminum-cobalt powder mixture was slowly added and mixed thoroughly, and the mixing continued until the binder dried, leaving a fairly freeflowing powder in which all of the alloy core particles were clad with a dry film which contained the aluminum and cobalt particles. The powder was warmed to about 250° F. to ensure complete drying. The powder was then screened and handmilled to reduce the same to a −140 +325 mesh powder. The powder so formed comprised particles of nickel-chromium alloy core with about 6 percent by weight each of fine aluminum particles and cobalt particles secured to the core with the binder. The powder was thermal sprayed on a mild steel plate which had been surface cleaned by smooth grinding. The spraying was effected with a standard plasma flame gun of the general type described in U.S. Pat. No. 3,145,287 and sold by METCO Inc., Westbury, New York, under the trademark METCO Type 7MB, using a 707 nozzle with No. 6 powder port, and a powder feeder of the type described in U.S. Pat. No. 3,501,097 and sold under the trademark METCO Type 3MP. Parameters were nitrogen plasma gas at 5.2 bars (75 psi) pressure and 2.12 m³/hr flow, 600 amperes, 65 volts, carrier gas 0.42 m³/hr, powder feed rate 2.7 kg/hr, spray distance between 10 and 15 cm. Excellent, well-bonded coatings were obtained. Coating hardness averages Rb 95. Deposit efficiency was 75 percent.

EXAMPLE 2

The process of Example 1 was repeated except using as a core an alloy of iron and 30 percent by weight chromium in place of the nickel-chromium. Similar results were obtained.

EXAMPLE 3

The process of Example 1 was repeated except fine molybdenum powder of minus 5 microns (average about 2.5 microns) was included in the initial blend of aluminum and cobalt in an amount equal to one half the weight of each of the aluminum or cobalt. The resulting powder comprised a core of nickel chromium alloy having about 6 percent by weight aluminum particles, 6 percent by weight cobalt particles and 3 percent by weight molybdenum particles secured thereto. Results were similar including hardness.

EXAMPLE 4

The process of Example 2 was repeated except with the addition of the fine molybdenum of Example 3. The resulting powder comprised a core of iron chromium alloy having about 6 percent by weight aluminum particles, 6 percent by weight cobalt particles and 3 percent by weight molybdenum particles secured thereto. Results were again similar.

EXAMPLE 5

The process of Example 1 was repeated except using a core of cobalt alloy containing 27 percent by weight chromium, 5 percent molybdenum, 3 percent nickel, 1 percent iron and 0.25 percent carbon. Also the amounts of individual constituents of aluminum and cobalt were adjusted to produce a powder having 6 percent aluminum and 7 percent cobalt secured to the core with the binder. Coatings were sprayed as in Example 1 except coatings were obtained by plasma spraying using a secondary gas of hydrogen at 3.4 bars (50 psi) pressure and 0.42 m³/hr flow added to the primary gas of nitrogen at 3.4 bars and 2.8 m³/hr. Other modified parameters included a G nozzle, No. 1 powder port, 400 amperes, 75 volts, 7.2 kg/hr spray rate, and spray distance 10 to 15 cm. High quality, well-bonded coatings were obtained.

Other coatings of the cobalt alloy core composite were produced with a combustion-type powder spray gun as described in U.S. Pat. No. 2,961,335 and sold by METCO Inc., Westbury, New York under the trademark METCO Type 5P Thermospray gun. Spraying was effected with a P7G nozzle at a spray rate of 3.6 kg/hr, using acetylene as fuel at a pressure of 1.0 bars (15 psi) and a flow rate of 0.91 m³/hr and oxygen at a pressure of 1.7 bars (25 psi) and a flow rate of 0.93 m³/hr, and spray distance of 18 cm. Very good coatings were obtained.

EXAMPLE 6

The powder made as described in Example 1 was thermal sprayed with the combustion-type powder spray gun used in Example 5. Spraying was effected with a P7G nozzle at a spray rate of 2.3 kg/hr, using acetylene as fuel at 1.0 bars (15 psi) and 0.96 m³/hr, oxygen at 2.1 bars (30 psi) and 0.96 m³/hr, and spray distance of 18 cm. Excellent, well-bonded coatings were obtained.

EXAMPLE 7

The process of Example 1 was repeated except the amounts of individual constituents of aluminum and cobalt were adjusted to produce a powder having 4.5 percent aluminum and 10 percent cobalt secured to the core with the binder. Results were very similar to those of Example 1.

Tests were carried out on selected coatings of the examples and known powders.

Tensile bond tests on mild steel prepared by rough grit blasting were done in accordance with ASTM Standard Method C633-69. Results are given in Table 1 for selected powders of these examples as well as for several known composite powders. The prior art composites reported in this and subsequent tables are in the form of alloy cores having specified constituents secured thereto with an organic binder.

TABLE 1

| Tensile Bond Strength (average or typical) | |
|---|---|
| Powder Thermal Sprayed | Bond Strength (psi) |
| NiCr—6Al—6Co (Example 1) | 12,300 |
| FeCr—6Al—6Co (Example 2) | 9,360 |
| NiCr—6Al—6Co—3Mo (Example 3) | 11,460 |
| FeCr—6Al—6Co—3Mo (Example 4) | 11,740 |
| NiCr—6Al (Composite) | 8,110 |
| FeCr—6Al—3Mo (Composite) | 7,500 |
| NiCr—4.5Al—10Co (Example 7) | 10,800 |

Oxidation resistance was determined as a percent weight gain measured on substrate-free coatings kept at 1100° C. in a static air environment in a high temperature furnace after 30 hours of exposure. Results for various coatings including prior known composites and alloys are given in Table 2.

TABLE 2

| Oxidation Resistance | |
|---|---|
| Powder Thermal Sprayed | Percent Weight Gain |
| NiCr—6Al—6Co (Example 1) | 1.1 |
| NiCr—6Al—6Co—6Mo (Example 3) | 1.0 |
| (Ni—16Cr—8Fe)—7Al—5.5Mo (Composite) | 6.0 |
| Ni—4.5Al (Composite) | 7.1 |
| NiCr (Alloy) | 5.2 |
| NiCr—6Al (Composite) | 3.4 |
| NiCr—6Al—3Mo (Composite) | 3.1 |
| Ni—22Cr—10Al—1Y (Alloy) | 1.7 |
| NiCr—4.5Al—10Co (Example 7) | 1.1 |

High temperature sulfidation tests in oxidizing atmosphere were done with molten salts, using industrial accepted procedures. A cold rolled steel pin of about 0.4 cm. diameter and rounded ends was fully coated with the experimental coating. It was placed half immersed in a crucible containing a salt mixture of 90 percent by weight $Na_2SO_4$ and 10 percent NaCl. The crucible with the salt mixture and pin was kept in a high temperature furnace maintained at 750° C. in static air environment. At this temperature the salt melts, and one half of the pin was exposed to molten salt and the other half of the coated pin was exposed to corrosive vapor containing sodium, sulfur and chlorine species. The test was run for varying lengths of time and stopped if visual degradation was observed. At the end of the test, the pins were removed, sectioned at both ends and examined metallographically. The results are given in Table 3.

TABLE 3

| Sulfidation - Oxidation | | |
|---|---|---|
| Powder Thermal Sprayed | Time to Degrade (Hours) | Comments |
| Ni—4.5Al (Composite) | 8 | Catastrophic-Liquid and vapor phase |
| NiCr—6Al (Composite) | 16 | Catastrophic-Liquid phase |
| FeCr—6Al—3Mo (Composite) | 16 | Major attack-Vapor phase |
| FeCr—6Al—6Co (Ex. 2) | 40 | Minor scaling-Vapor phase |
| FeCr—6Al—6Co—3Mo (Ex. 4) | 40 | Minor scaling-Vapor phase |
| Cobalt Alloy—6Al—7Co (Ex. 5) | 40 | Minor attack-Liquid phase |
| NiCr—4.5Al—10Co (Ex. 7) | 45 | No failure |
| NiCr—6Al—6Co (Ex. 4) | 45 | No failure |
| NiCr—6Al—6Co—3Mo (Ex. 3) | 45 | No failure |

A dry char test was done to simulate smelt conditions, which comprise a reducing atmosphere with certain contaminants. In this test, a fused solid was made by fusing together from 72–73 percent by weight $Na_2Co_3$, and 10 percent of NaCl. This was crushed to a powder, and the coated steel pins were kept embedded in this powder in a dry condition at 50° C. for 2 weeks (336 hours). The pins in this condition were exposed to vapors of sodium, sulfur and chlorine compounds. At the end of the test, the pins were removed, lightly cleaned for scale removal, and weight loss determined. Also, they were sectioned and evaluated metallographically. Results are presented in Table 4.

TABLE 4

| Dry Char | |
|---|---|
| Powder Thermal Sprayed | Weight Loss (mg) |
| FeCr—6Al—3Mo (Composite) | 20 |
| FeCr—6Al—6Co (Example 2) | 10 |
| FeCr—6Al—6Co—3Mo (Example 4) | 10 |
| Ni—4.5Al (Composite) | 140 |
| NiCr—6Al (Composite) | 45 |
| NiCr—6Al—6Co—3Mo (Example 3) | 25 |

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. A thermal spray composite characterized by ability to produce tenacious and corrosion resistant coatings, comprising:
   a base constituent comprising at least one base metal selected from the group consisting of nickel, iron and cobalt, and at least one modifying element selected from the group consisting of chromium and aluminum; and
   elemental constituents comprising aluminum and cobalt.

2. The thermal spray composite of claim 1 wherein the base constituent is an alloy comprising the base metal and the modifying element.

3. The thermal spray composite of claim 2 wherein the alloy base constituent further comprises at least one additional element selected from the group consisting of yttrium and rare earth metals.

4. The thermal spray composite of claim 1 wherein the elemental constituents aluminum and cobalt are each present in amount of about 1 to 15 percent by weight of the total of the base constituent and the elemental constituents.

5. The thermal spray composite of claim 1 wherein the elemental constituents further comprise molybdenum.

6. The thermal spray composite of claim 4 wherein the individual constituents further comprise molybdenum in an amount of about 1 to 10 percent by weight of the total of the base constituent and the elemental constituents.

7. The thermal spray composite of claim 1 wherein the composite is a powder between about −100 mesh and +5 microns.

8. The thermal spray composite powder of claim 7 wherein the base constituent is in the form of a core of an alloy comprising the base metal and the modifying element, and the elemental constituents are each in the form of minus 10 micron particles secured to the core with a binder.

9. The thermal spray composite of claim 1 wherein the modifying element is chromium in an amount of about 1 to 55 percent by weight of the base constituent, and the elemental constituents aluminum and cobalt are each present in an amount of about 1 to 15 percent by weight of the total of the base constituent and the elemental constituents.

10. The thermal spray composite of claim 2 wherein the modifying element is aluminum in an amount of about 1 to 55 percent by weight of the base constituent, and the elemental constituents aluminum and cobalt are each present in an amount of about 1 to 15 percent by weight of the total of the base constituent and the elemental constituents.

11. The thermal spray composite of claim 2 wherein the modifying elements are chromium and aluminum in a total amount of about 1 to 55 percent by weight of the base constituent, and the elemental constituents aluminum and cobalt are each present in an amount of about 1 to 15 percent by weight of the total of the base constituent and the elemental constituents.

12. The thermal spray composite of claim 9 or 10 or 11 wherein the elemental constituents further comprise molybdenum in an amount of about 1 to 10 percent by weight of the total of the base constituents and the elemental constituents.

13. A thermal spray composite powder between about −100 mesh and +5 microns characterized by ability to produce tenacious and corrosion resistant coatings, comprising:
a core of an alloy comprising nickel and chromium, the chromium being present in an amount of about 1 to 55 percent by weight of the alloy core; and
elemental constituents comprising minus 10 micron aluminum and cobalt particles secured to the alloy core with an organic binder, the aluminum and cobalt particles each being present in an amount of about 1 to 15 percent by weight of the total of the alloy core and the elemental constituents.

14. A thermal spray composite powder between about −100 mesh and +5 microns characterized by ability to produce tenacious and corrosion resistant coatings, comprising:
a core of an alloy comprising iron and chromium, the chromium being present in an amount of about 1 to 55 percent by weight of the alloy core; and
elemental constituents comprising minus 10 micron aluminum and cobalt particles secured to the alloy core with an organic binder, the aluminum and cobalt particles each being present in an amount of about 1 to 15 percent by weight of the total of the alloy core and the elemental constituents.

15. A thermal spray composite powder between about −100 mesh and +5 microns characterized by ability to produce tenacious and corrosion resistant coatings, comprising:
a core of an alloy comprising iron and aluminum, the aluminum being present in an amount of about 1 to 55 percent by weight of the alloy core; and
elemental constituents comprising minus 10 micron aluminum and cobalt particles secured to the alloy core with an organic binder, the aluminum and cobalt particles each being present in an amount of about 1 to 15 percent by weight of the total of the alloy core and the elemental constituents.

16. The thermal spray composite powder of claim 13 or 14 or 15 wherein the elemental constituents further comprise minus 10 micron molybdenum particles which are secured to the alloy core with the organic binder and are present in an amount of about 1 to 10 percent by weight of the total of the alloy core and elemental constituents.

17. The thermal spray composite powder of claim 15 wherein the aluminum present in the alloy core is in an amount of about 20 to 55 percent.

18. A process for producing a tenacious and corrosion resistant coating comprising thermal spraying a thermal spray composite comprising a base constituent comprising at least one metal selected from the group consisting of nickel, iron and cobalt, the base constituent further comprising at least one modifying element selected from the group consisting of chromium and aluminum, and the composite further comprising elemental constituents comprising aluminum and cobalt.

19. The process of claim 18 wherein the composite is a powder between about −100 mesh and +5 microns, the base constituent is in the form of a core of an alloy comprising the base metal and the modifying element, and the elemental constituents are each in the form of minus 10 micron particles secured to the core with a binder.

20. The process of claim 18 wherein the elemental constituents further comprise molybdenum.

21. The process of claim 18 wherein the composite is a powder between about −100 mesh and +5 microns, the base constituent is in the form of a core of an alloy comprising nickel and chromium, the chromium is present in an amount of about 1 to 55 percent by weight of the alloy core, and the elemental constituents aluminum and cobalt are in the form of minus 10 micron particles secured to the core with a binder and are each present in an amount of about 1 to 15 percent by weight of the total of the base constituent and the elemental constituents.

22. The process of claim 18 wherein the composite is a powder between about −100 mesh and +5 microns, the base constituent is in the form of a core of an alloy comprising iron and chromium, the chromium is present in an amount of about 1 to 55 percent by weight of the alloy core, and the elemental constituents aluminum and cobalt are in the form of minus 10 micron particles secured to the core with a binder and are each present in an amount of about 1 to 15 percent by weight of the total of the base constituents and the elemental constituents.

23. The process of claim 18 wherein the composite is a powder between about −100 mesh and +5 microns, the base constituent is in the form of a core of an alloy comprising iron and aluminum, the aluminum is present in an amount of about 1 to 55 percent by weight of the alloy core, and the elemental constituents aluminum and cobalt are in the form of minus 10 micron particles secured to the core with a binder and are each present in an amount of about 1 to 15 percent by weight of the total of the base constituent and the elemental constituents.

24. The process of claim 21 or 22 or 23 wherein the elemental constituents further comprise minus 10 micron molybdenum particles which are secured to the core with the binder and are present in an amount of about 1 to 10 percent by weight of the total of the alloy constituent and elemental constituents.

25. The process of claim 18 wherein the thermal spraying comprises plasma spraying the thermal spray powder.

* * * * *